Oct. 22, 1935.　　J. A. STREUN　　2,018,289
CONVEYER FOR COTTON
Filed April 4, 1932
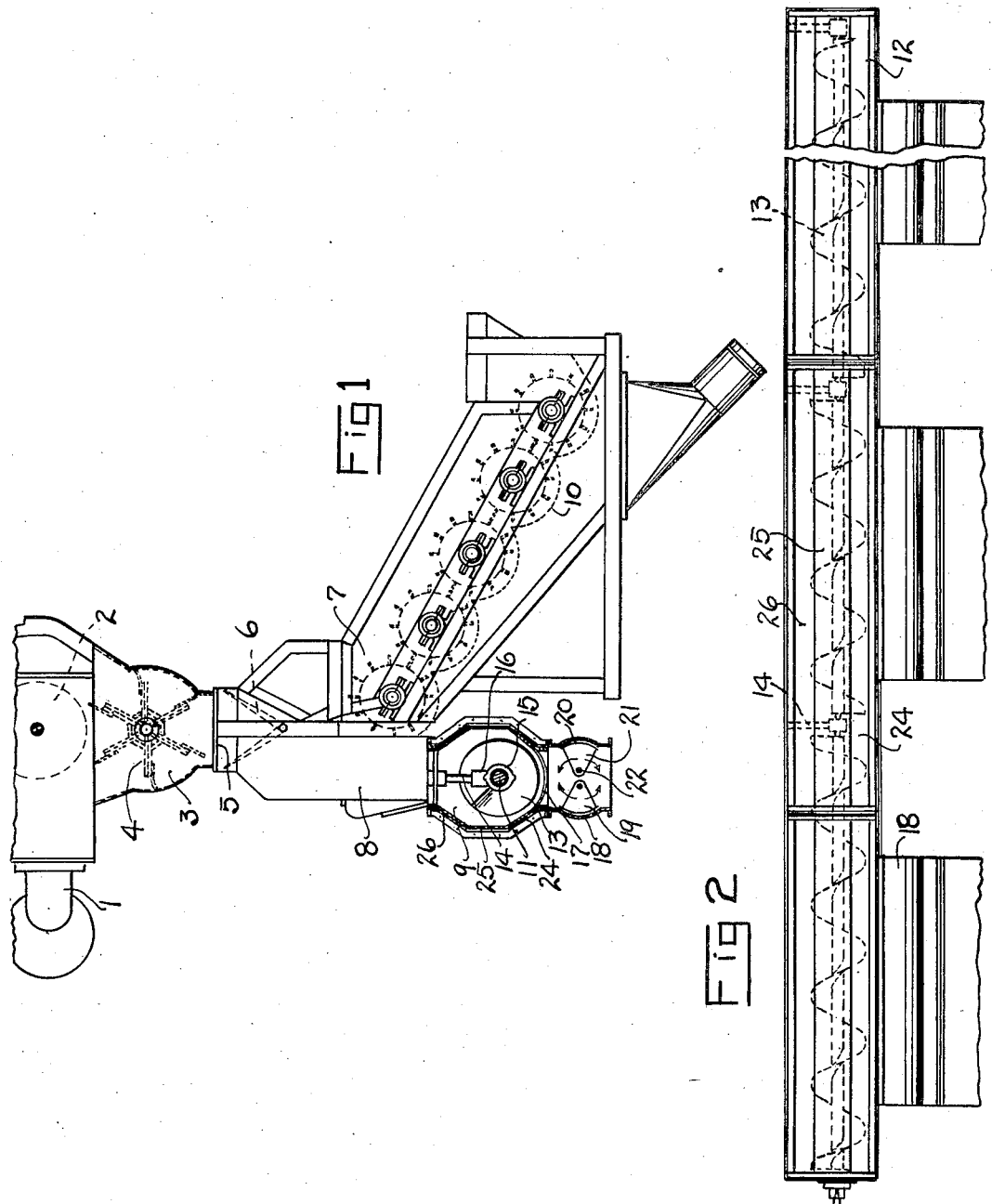
John A. Streun Inventor
By Jesse R. Stone & Lester B. Clark
Attorneys Patented Oct. 22, 1935

2,018,289

UNITED STATES PATENT OFFICE 2,018,289

CONVEYER FOR COTTON

John Arnold Streun, Sherman, Tex., assignor to Hardwicke-Etter Company, a corporation Application April 4, 1932, Serial No. 602,887

3 Claims. (Cl. 19—74)

My invention relates to a conveyer to be employed in moving the cotton from the cleaner or separator to the cotton gin.

The cotton is usually removed from the wagon or truck which brings the same to the gin, into a separator by means of a suction device, and from there it is passed through a cleaning and hulling device to a conveyer which conveys the cotton along a trough or chute to the hoppers of the various gins into which the cotton is moved and dropped downwardly to the gin.

The difficulty ordinarily experienced with screw conveyers which are commonly used for this purpose, is that the conveyer is housed within a trough or chute with sides that extend upwardly away from the conveyer and allow the cotton to be crowded upwardly by the vanes upon the conveyer and, for this reason, the cotton does not feed from the trough into the hopper of the gin as it should. Bolls of cotton drop from the chute into the hopper as the mass of seed cotton passes the hoppers, but it is desired to force the cotton downwardly and crowd it into the hopper of the gin and keep the hopper filled. Instead of having individual bolls of the cotton dropping all along the chute into the individual hoppers for the battery of gins, it is desired to crowd masses of the cotton bolls into the hopper of the first gin until that hopper is full and then pass the cotton on to the hopper of the next gin and fill that hopper in the same manner so that there will be a plurality of the gins in line, the hopper of each of which is crowded full of cotton to be handled by the gin. The difficulty usually experienced is that a large part of the cotton is carried past the hoppers and is dumped at the end of the conveyer and has to be moved back through the conveyer again.

It is an object of my invention to so arrange the walls of the conveyer that the cotton will be held against the blades of the conveyer and carried around and forced through the openings into the hoppers of the gins and keep them tightly filled at all times.

It is also an object to provide a conveyer which is easily filled with the cotton coming from the cleaner, and which will allow the cotton to be positively engaged by the conveyer and moved along the same for feeding to the gins in the manner described.

In the drawing herewith Fig. 1 is a side elevation of a conveyer shown in connection with the usual cleaning device and separator, the conveying portion of the device being in transverse section.

Fig. 2 is a front view of a conveyer showing the operating mechanism removed and the chutes of the gins broken away.

It is to be understood that my conveyer may be employed in connection with any suitable construction of separator or cleaner. I have shown in the drawing an upper separator in which the cotton is drawn through a flue 1 to a separating chamber 2 from which it is fed to the valve chamber 3 which by rotation feeds the cotton between the arms 4 thereof downwardly through an opening 5 controlled by a valve 6 either to a cleaner 7 or through a passage-way 8 directly to the conveyer chamber 9.

After the valve 6 is moved to direct the cotton from the separator to the cleaner 7, the cotton is moved longitudinally thereof and over a perforated screen 10 back upwardly and is delivered to the upper end of the conveyer chamber.

Within the conveyer chamber is a longitudinal shaft 11 which projects from the end of the conveyer chamber and is ordinarily equipped with pulleys or gears, not shown, by means of which it may be rotated in any preferred manner. This shaft extends the full length of the conveyer box 12 and is equipped with a spiral blade 13 which, through the rotation of the shaft, moves the cotton from one end of the conveyer box longitudinally thereof to the other end where cotton still remaining in the box is discharged from the end to storage where it is carried back and again fed through the machine.

The shaft is supported at points throughout its length by hangers 14. I have shown a hanger comprising a lower bearing sleeve 15 connected with an upwardly extending arm 16 supported at its upper end upon the frame of the conveyer box.

The lower side of the conveyer box has longitudinal openings 17 therein above each of the gins. Below each opening is a hopper 18 equipped with rotary valves 19. Said valves comprise longitudinal plates 20 connected at their ends to sector-shaped plates 21 pivoted at 22 and adapted to be rotated by a suitable mechanism, not shown, to open or close the passage from the conveyer to the gin.

Attention is now called to the particular shape of the conveyer box or trough which houses the spiral conveyer. The lower side of the trough is provided with sides 24 which slope downwardly to the openings 17, thus allowing the cotton to be crowded toward the openings. Above the sloping sides 24 the trough may have a vertical section 25 and above the vertical sides the walls converge inwardly at 26, and are spaced fairly closely to the upper edge of the rotating conveyer. Thus cotton fed into one end of the conveyer trough will be moved along the trough by the conveyer blade. The tendency of the cotton to crowd upwardly away from the lower side of the trough will be then limited by the sloping wall 26 at the upper side of the trough, thus holding the cotton against the conveyer. The conveyer will thus be enabled to engage the cotton and carry it toward the lower side of the trough more effectively and thus act to crowd the cotton through the openings 17 into the hoppers of the gins. This shape of the conveyer box which enables the rotator conveyer to thus effectively handle the cotton, has been found to be exceedingly important. Where it has been impossible with the usual type of conveyer with vertical sides or upwardly flaring sides to properly move the cotton to the underside of the conveyer line so as to feed it to the hoppers of the gin, with my arrangement, with the upper walls sloping inwardly closely adjacent to the rotating blade of the conveyer, I maintain the hoppers of each of the successive gins crowded closely with cotton so that the supply to each of the gins is uniform and unlimited except by the capacity of the gin.

While I have shown the conveyer as employed with a particular type of cleaner and separator, it will be obvious that the manner in which the cotton is fed to the conveyer is more or less immaterial. Furthermore, the particular type of valve below the conveyer is immaterial. It is, however, an important feature that the upper wall of the conveyer box be carried inwardly above the blade of the conveyer in the manner described.

Having described my invention, what I claim is:

1. A cotton conveyer for delivering cotton to the hoppers of a plurality of gins, including a longitudinal housing, a single screw conveyer mounted to rotate therein to move the cotton longitudinally thereof, a bottom wall therein having openings leading to the several gins, vertical side walls closely adjacent each side of said conveyer, sloping walls between said side walls and said bottom wall, the walls above the side walls being sloped inwardly and spaced closely adjacent said conveyer to retain said cotton in position to be engaged by said conveyer and carried forcibly to said openings.

2. A conveyer for cotton and the like for feeding cotton to a plurality of gins, including a conveyer housing, a screw conveyer mounted longitudinally thereof and rotatable to move the cotton from one end to the other thereof, the bottom wall of said housing having openings therein at each of said gins, the side walls being formed with a vertical portion and inwardly sloping upper and lower portions connected therewith said side walls being positioned to lie closely adjacent the said conveyer on both sides, the upper inwardly sloping portions acting to retain the cotton against said conveyer, and means to deliver cotton to said conveyer.

3. A cotton conveyer including a screw conveyer, a longitudinal housing having walls arranged octagonally about said conveyer, there being a feed opening in the upper wall and discharge openings in the lower wall, said walls being closely adjacent said conveyer to retain the cotton against said conveyer on all sides, so that said conveyer may force it from said discharge openings.

JOHN ARNOLD STREUN.